United States Patent
Nader et al.

(10) Patent No.: US 7,555,319 B2
(45) Date of Patent: Jun. 30, 2009

(54) ADAPTIVE POWER EFFICIENT RADIO ENVIRONMENT MEASUREMENTS

(75) Inventors: Ali Nader, Malmö (SE); Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 654 days.

(21) Appl. No.: 11/277,111

(22) Filed: Mar. 21, 2006

(65) Prior Publication Data

US 2007/0225051 A1 Sep. 27, 2007

(51) Int. Cl.
*H04M 1/00* (2006.01)

(52) U.S. Cl. ............... 455/574; 370/318; 370/328; 370/311; 455/436; 455/434; 455/423

(58) Field of Classification Search ............... 455/574, 455/436, 434; 370/311, 328
See application file for complete search history.

(56) References Cited

U.S. PATENT DOCUMENTS

| | | | |
|---|---|---|---|
| 5,539,748 A | 7/1996 | Raith | |
| 5,903,838 A | 5/1999 | Yazaki et al. | |
| 6,292,660 B1 | 9/2001 | Hartless et al. | |
| 6,360,097 B1 | 3/2002 | Smith et al. | |
| 6,385,460 B1 | 5/2002 | Wan | |
| 6,483,815 B1 * | 11/2002 | Laurent et al. ............... | 370/318 |
| 6,584,331 B2 | 6/2003 | Ranta | |
| 7,035,676 B2 * | 4/2006 | Ranta ........................ | 455/574 |
| 7,110,765 B2 * | 9/2006 | Amerga et al. ............... | 455/436 |
| 7,133,702 B2 * | 11/2006 | Amerga et al. ............... | 455/574 |
| 7,415,273 B2 * | 8/2008 | Khawand .................... | 455/434 |
| 2003/0081657 A1 * | 5/2003 | Ranta ........................ | 375/147 |
| 2003/0153370 A1 * | 8/2003 | Sako .......................... | 455/574 |
| 2005/0096053 A1 | 5/2005 | Liu et al. | |

FOREIGN PATENT DOCUMENTS

| | | |
|---|---|---|
| EP | 0 812 119 A2 | 12/1997 |
| EP | 1 026 910 A1 | 8/2000 |
| EP | 1 146 756 A1 | 10/2001 |
| EP | 1 292 039 A2 | 3/2003 |

OTHER PUBLICATIONS

PCT International Preliminary Report on Patentability, dated Sep. 23, 2008, in connection with International Application No. PCT/EP2007/052446.
European Search Report dated Oct. 3, 2006, generated in connection with U.S. Appl. No. 11/277,111.

* cited by examiner

*Primary Examiner*—David Q Nguyen
(74) *Attorney, Agent, or Firm*—Potomac Patent Group PLLC

(57) ABSTRACT

User equipment (UE) in a cellular telecommunications system is operated such that the UE is caused to begin operating in a power saving state by determining that a first set of predefined criteria have been satisfied and is caused to leave the power saving state by determining that a second set of predefined criteria have been satisfied. Determining that the second set of predefined criteria have been satisfied includes making a plurality of signal quality measurements of a signal received from a serving cell during power saving state; determining which of the plurality of signal quality measurements represents a best one of the signal quality measurements; determining a threshold value as a function of the best one of the signal quality measurements; and determining that the second set of predefined criteria have been satisfied if a current signal quality measurement satisfies a predefined relationship with respect to the threshold value.

24 Claims, 6 Drawing Sheets

ADAPTIVE POWER EFFICIENT RADIO ENVIRONMENT MEASUREMENTS

BACKGROUND

The present invention relates to mobile telecommunication systems, and more particularly to methods and apparatuses that determine when and/or what measurements user equipment (UE) in a telecommunication system will make of its surrounding environment.

Digital communication systems include time-division multiple access (TDMA) systems, such as cellular radio telephone systems that comply with the GSM telecommunication standard and its enhancements like GSM/EDGE, and Code-Division Multiple Access (CDMA) systems, such as cellular radio telephone systems that comply with the IS-95, cdma2000, and Wideband CDMA (WCDMA) telecommunication standards. Digital communication systems also include "blended" TDMA and CDMA systems, such as cellular radio telephone systems that comply with the Universal Mobile Telecommunications System (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for economy of explanation, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (user equipment or users), respectively, in the downlink (base-to-user equipment) direction. User Equipment (UE) communicates with the system through, for example, respective dedicated physical channels (DPCHs). WCDMA terminology is used here, but it will be appreciated that other systems have corresponding terminology. Scrambling and channelization codes and transmit power control are well known in the art.

FIG. 1 depicts a mobile radio cellular telecommunication system 100, which may be, for example, a CDMA or a WCDMA communication system. Radio network controllers (RNCs) 112, 114 control various radio network functions including for example radio access bearer setup, diversity handover, and the like. More generally, each RNC directs UE calls via the appropriate base station(s) (BSs), which communicate with each other through downlink (i.e., base-to-UE or forward) and uplink (i.e., UE-to-base or reverse) channels. RNC 112 is shown coupled to BSs 116, 118, 120, and RNC 114 is shown coupled to BSs 122, 124, 126. Each BS serves a geographical area that can be divided into one or more cell(s). BS 126 is shown as having five antenna sectors S1-S5, which can be said to make up the cell of the BS 126. The BSs are coupled to their corresponding RNCs by dedicated telephone lines, optical fiber links, microwave links, and the like. Both RNCs 112, 114 are connected with external networks such as the public switched telephone network (PSTN), the Internet, and the like through one or more core network nodes like a mobile switching center (not shown) and/or a packet radio service node (not shown). In FIG. 1, UEs 128, 130 are shown communicating with plural base stations: UE 128 communicates with BSs 116, 118, 120, and UE 130 communicates with BSs 120, 122. A control link between RNCs 112, 114 permits diversity communications to/from UE 130 via BSs 120, 122.

At the UE, the modulated carrier signal (Layer 1) is processed to produce an estimate of the original information data stream intended for the receiver. The composite received baseband spread signal is commonly provided to a RAKE processor that includes a number of "fingers", or de-spreaders, that are each assigned to respective ones of selected components, such as multipath echoes or streams from different base stations, in the received signal. Each finger combines a received component with the scrambling sequence and the appropriate channelization code so as to de-spread a component of the received composite signal. The RAKE processor typically de-spreads both sent information data and pilot or training symbols that are included in the composite signal.

In cellular telecommunication systems, such as but not limited to the UMTS, there is a trade-off with respect to how often a UE should measure its surrounding environment, as well as the extent of those measurements. The more frequently a UE measures and keeps track of the surrounding environment (e.g., neighboring cells), the lower the possibility of experiencing loss of coverage, missing incoming calls, and the like. However, the more a UE actually measures, the more power it consumes. Since, more often than not, UEs are operated on battery power, higher power consumption associated with measurement activities leads to undesirable effects, such as lower standby time.

In some telecommunication systems, such as WCDMA systems, there exist measurement related threshold values (e.g., $S_{intrasearch}$, which is an optional parameter broadcast by the network that specifies the threshold (in dB) for intra frequency measurements; and QqualMin, which is a mandatory parameter broadcast by the network that defines the minimum required quality level (in dB) in the serving cell) that can optionally be broadcast by the network (NW) to the UEs in a cell. The UE may compare the measured signal quality of its received signal to the received threshold value(s), and based on this comparison stop performing measurements on the surrounding environment if the received signal quality of the cell currently camped on is above the received threshold value(s).

In some other cases, UE vendors have implemented their own hard-coded threshold values based on, for example, characteristics of their particular receiver blocks.

There are several problems with the existing implementations. For example, in some cases, such as the one described above in which there is a possibility of conveying measurement threshold values from the network to the UEs, network operators do not want to risk having the UEs measure too infrequently and consequently losing coverage or missing calls. The loss of services to UEs is both inconvenient and possibly vexatious to users and may result in a substantial loss of goodwill to the operator of the mobile network. Hence, such thresholds are either not sent at all or are set to such levels that they ensure that the UE will measure rather often, even under circumstances in which such measurement is totally unnecessary. In the most common cases, the UE normally performs its measurements during its Discontinuous Reception (DRX) cycles. That is, when not being operated by its user, the UE is normally in a sleep mode, with its radio turned off. However, at such DRX cycles the UE might receive messages and hence has to turn on its radio and scan some channels. As the radio is turned on anyway, the UE might coordinate its operations so that it performs its measurements during these occasions. However, many of these measurements are unnecessary if the UE is in a stable environment (e.g. when the UE is lying still on a table) because no new information would be obtained from such measurements.

In some other cases, the UE vendors have implemented their own hard-coded thresholds. These thresholds are often developed in a lab environment or by experiments performed in some real environment and are tightly coupled with the radio characteristics of the specific UE. The problem in such cases is the inability to adapt these thresholds to the real surrounding environment.

All these unnecessary measurements drain the battery power and affect the standby time of the UE.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate User Equipment (UE) in a cellular telecommunications system in such a way that the UE is caused to begin operating in a power saving state by determining that a first set of predefined criteria have been satisfied and is caused to leave the power saving state by determining that a second set of predefined criteria have been satisfied. Determining that the second set of predefined criteria have been satisfied includes making a plurality of signal quality measurements of a signal received from a serving cell during power saving state; determining which of the plurality of signal quality measurements represents a best one of the signal quality measurements; determining a threshold value as a function of the best one of the signal quality measurements; and determining that the second set of predefined criteria have been satisfied if a current signal quality measurement satisfies a predefined relationship with respect to the threshold value.

In another aspect, determining the threshold value as a function of the best one of the signal quality measurements comprises subtracting a signal quality measurement of a neighboring cell's signal from the best one of the signal quality measurements.

In still another aspect, operating the UE comprises receiving a serving cell offset value from a serving cell of the UE. Furthermore, determining the threshold value as a function of the best one of the signal quality measurements comprises adjusting the best one of the signal quality measurements by subtracting a signal quality measurement of a neighboring cell's signal from the best one of the signal quality measurements and by adding the serving cell offset value.

In yet another aspect, determining the threshold value as a function of the best one of the signal quality measurements comprises selecting the adjusted best one of the signal quality measurements if the adjusted best one of the signal quality measurement does not indicate a lower quality than a predetermined low limit value.

In yet another aspect, operation of the UE comprises determining that the second set of predefined criteria have been satisfied if the current signal quality measurement satisfies a predetermined relationship with respect to a term derived from one or more telecommunication network-supplied parameters.

In some embodiments, the telecommunications system is a Wideband Code Division Multiple Access (WCDMA) telecommunications system, and the term derived from the one or more telecommunication network-supplied parameters is $S_{intrasearch}+QqualMin$, wherein $S_{intrasearch}$ is a parameter that specifies a threshold for intra-frequency measurements, and QqualMin defines a minimum required quality level within the serving cell.

In still another aspect, the plurality of signal quality measurements are a plurality of signal-to-noise ratio measurements In yet another aspect, the plurality of signal quality measurements are a plurality of received signal code power measurements.

In still another aspect, operating the UE comprises, upon entering a full measurement state from the power saving state, remaining in the full measurement state for a predefined period of time regardless of a determination that the first set of predefined criteria have been satisfied during the predefined period of time.

In yet another aspect, the power saving state comprises a first power saving state and a second power saving state, wherein fewer measurements are made during the second power saving state than in the first power saving state; and operating the UE comprises entering the first power saving state from a full measurement state; and detecting that the first set of predefined criteria have been satisfied for a predefined period of time, and in response to said detection, causing the UE to begin operating in the second power saving state.

In still another aspect, determining that the first set of predefined criteria have been satisfied includes making a current signal quality measurement of a signal received from the serving cell during a non-power saving state, and determining a threshold value as a function of a constant stored in the UE. It is then determined that the first set of predefined criteria have been satisfied if the current signal quality measurement satisfies a predefined relationship with respect to the threshold value. In some embodiments, determining the threshold value as a function of the constant stored in the UE comprises combining the constant stored in the UE with a value supplied by the telecommunications network.

BRIEF DESCRIPTION OF THE DRAWINGS

The objects and advantages of the invention will be understood by reading the following detailed description in conjunction with the drawings in which.

DETAILED DESCRIPTION

Figure 1:
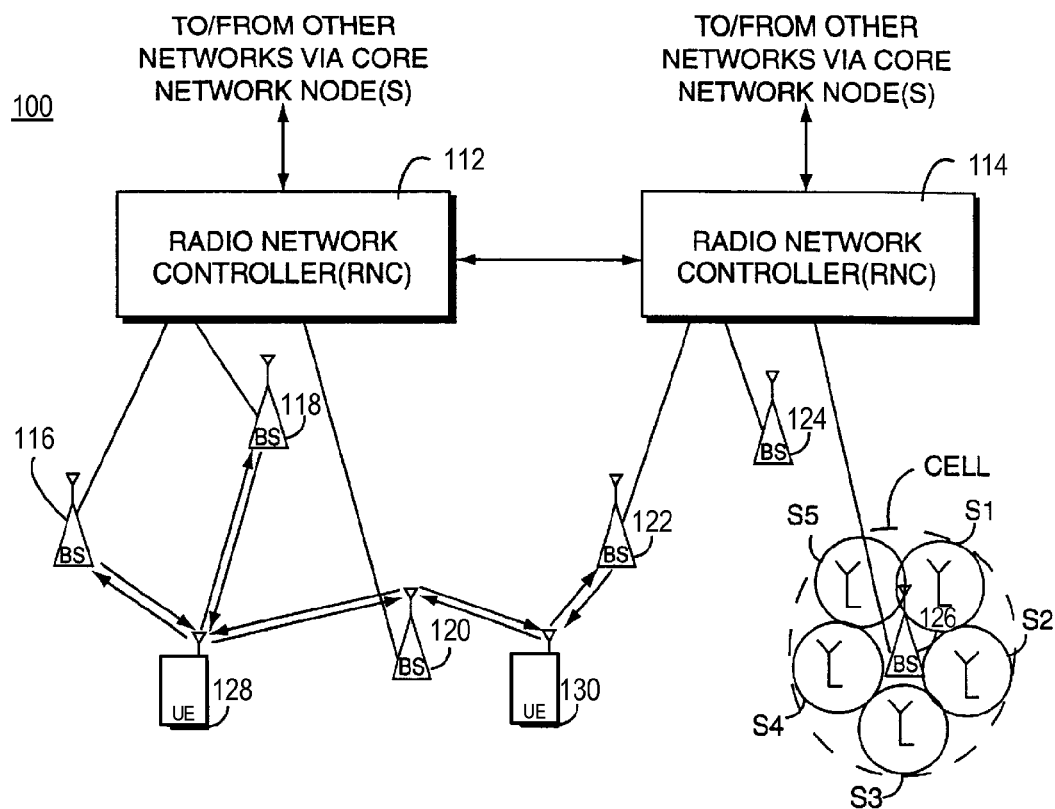
FIG. 1 depicts a mobile radio cellular telecommunication system 100, which may be, for example, a CDMA or a WCDMA communication system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In one aspect, methods and/or apparatuses operate a UE in such a way that it does not perform measurements of its surrounding environment at a high rate when it is situated in a stable condition. In this way, the UE can avoid a needless expenditure of energy.

In another aspect, detecting whether the UE is in a stable condition is not limited to the use of fixed threshold values. Instead, one or more adaptable threshold values are provided that are able to change over time in accordance with existing conditions. The UE can then perform measurements on the surrounding area and detect some characteristics that are indicative of either a stable or unstable environment. The UE can also compare the measured values to one or more threshold values that adapt to the surrounding radio environment. Once such stable/unstable conditions are recognized, the UE may go into an appropriate one of a number of different states and perform measurements at a higher or lower intensity as is appropriate for the detected environment.

In another aspect, a number of different measurement states can be provided in a UE. For example, the following measurement states can be defined:

Full Measurement State, in which measurements and searches for new cells are required.

Limited Measurement State, in which measurements and searches are performed for new cells, but with a lower rate than is performed in the Full Measurement State.

Low Rate Measurement State, in which measurements and searches are performed for the serving cell (cell currently connected to) and possibly one additional cell in order to estimate when the environment has changed.

These and other aspects will now be described in greater detail.

In order to facilitate a better understanding of the various aspects of the invention, the exemplary embodiments presented herein are described in the context of a WCDMA system. In this context, the measured Received Signal Code Power is referred to as RSCP, the measured signal-to-noise ratio is referred to as Ec/Io, and the cell that a UE is currently connected to (which in a WCDMA system will be the strongest cell in the vicinity) is referred to as the serving cell. It is further assumed that the various steps and processes described herein are performed during DRX cycles. Notwithstanding these contexts, it is to be understood that the embodiments described herein are merely exemplary, and are not to be construed as limiting the invention to WCDMA systems, the mentioned measured entities, or DRX modes.

The term "measured surroundings" is used throughout the description. As used herein, this term should be construed broadly to include at least any of the following:

Measured value of the best non-serving neighboring cell.

Average of measured values of a predetermined number of the best non-serving neighboring cells.

Weighted average of measured values of a predetermined number of the best non-serving neighboring cells.

Weighted sum of measured values of a predetermined number of the best non-serving neighboring cells.

As mentioned earlier, in order to enable the UE to avoid a needless expenditure of energy, it is operated in such a way that it does not perform measurements of its surrounding environment at a high rate when it is situated in a stable condition. More particularly, depending on the level of environmental stability, the UE can enter a suitable one of a number of predefined measurement states. Such measurement states can include:

Full Rate Measurement State: In this state, measurement and cell search rates are in steady state as specified by the applicable standards (e.g., those defined by the 3GPP specifications). When entering this state from any of the other measurement states, the rate of cell searching increases (and can even be designed to be continuous during an initial predetermined period of time).

Power Saving State: In this state, measurement and/or cell searches are performed at a reduced rate (compared to the Full Rate Measurement State), so that the UE is able to conserve energy. The Power Saving State can, for example be one or (as will be explained later in the description) both of the following:

Limited Rate Measurement State: In this state, measurements on the serving cell are performed at the same rate as specified in the applicable standards. However, the rate of measuring the measured surroundings is lower. The rate of cell searching (which is the most power consuming activity) is also decreased by a predefined factor.

Low Rate Measurement State: In this state, measurements are performed only on the serving cell (an in alternative embodiments, also on the best non-serving cell) at the same rate as is specified by the applicable standards. No other measurements are performed on the measured surroundings. However, the measurement results on the surroundings just prior to entering this state are retained in a cell database so that these cells can (if still available) be found again when leaving his state.

In the above-described states, the Ec/Io and/or the RSCP measurements of the serving cell and possible measured surroundings are filtered in a relatively long (e.g., on the order of 1 second or longer) averaging Infinite Impulse Response (IIR) filter to obtain a good estimate of an average value of the measurement(s).

The discussion will now focus on techniques and apparatuses for detecting whether the UE is moving, or is otherwise in an unstable environment that would require more frequent measurements. For this purpose, the RSCP (e.g., as measured on the Common Pilot Channel, or "CPICH", in WCDMA systems) is useful in the sense that it measures the path loss, which is related to the UE' s distance from the base station. Thus, changes in RSCP are better at detecting physical movement of the UE than are measurements of the Ec/Io. When the UE is not close to the serving cell's border, the Ec/Io (e.g., as measured on the CPICH in WCDMA systems) is relatively stable because the inter-cell interference is dominant. When moving, both the cell interference and the RSCP are changing. Consequently, the ratio between the RSCP and the total interference (Ec/Io) is relatively constant.

The Ec/Io is, however, a better indicator of performance in a CDMA system because CDMA systems are interference limited. Changes in UE performance may be another trigger for changing from one measurement state to another.

In an aspect of the invention, fixed as well as adaptive threshold values are used in the process of determining whether a UE is in a stable environment. More particularly, one or more threshold values are used by the UE to determine when to stop measuring neighboring cells, and also when to stop searching for new neighbors. In exemplary embodiments, threshold values are implemented against which the Ec/Io is compared, and other threshold values are implemented against which the RSCP is compared. Power saving state is entered and exited in response to predefined criteria being satisfied, the criteria including current signal quality measurements satisfying predefined relationships with respect to one or more of the threshold values.

Figure 2:
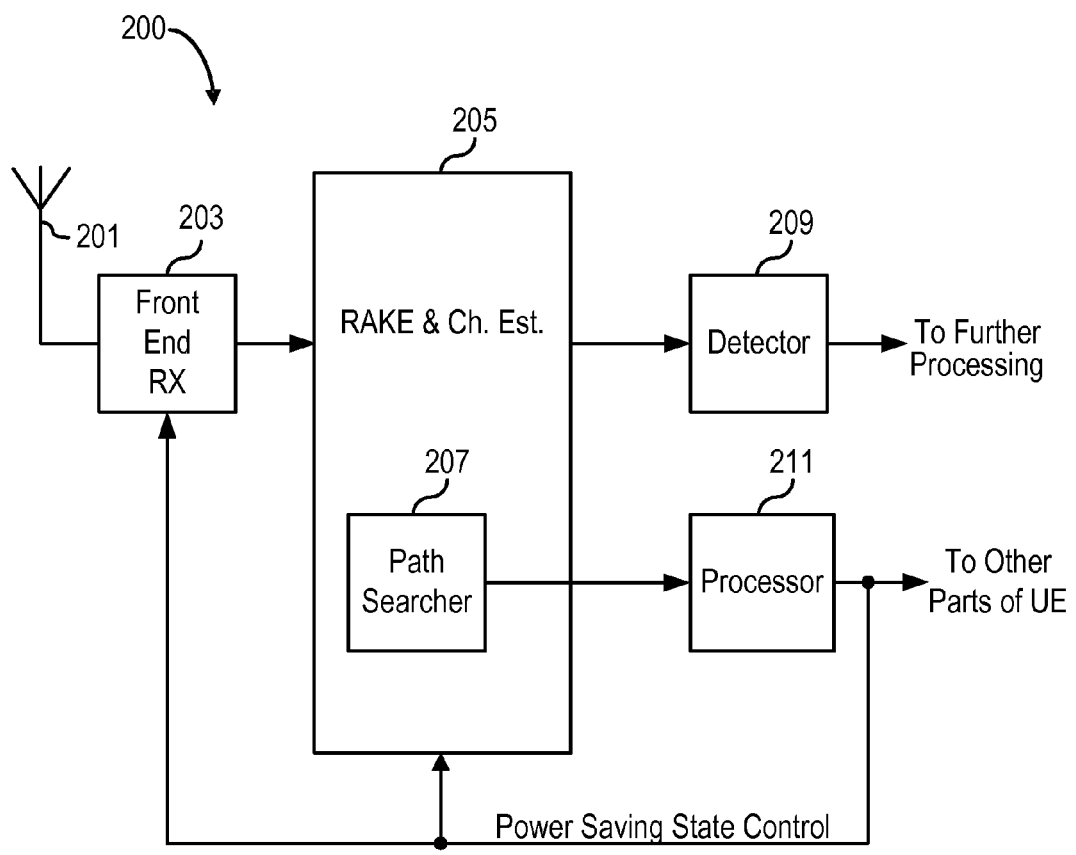
FIG. 2 is a block diagram of a receiver, such as a UE in a WCDMA communication system.

These and other aspects will now be described in greater detail. Looking first at exemplary hardware for carrying out the variously described processes, FIG. 2 is a block diagram of a receiver 200, such as a UE in a WCDMA communication system, that receives radio signals through an antenna 201 and down-converts and samples the received signals in a front-end receiver (Front End RX) 203. The output samples are fed from Fe RX 203 to a RAKE combiner and channel estimator 205 that de-spreads the received data including the pilot channel, estimates the impulse response of the radio channel, and de-spreads and combines received echoes of the received data and control symbols. In order to de-spread the received signal, the RAKE combiner and channel estimator 205 needs to know which, of the possible paths that the received signal might be spread on, are the strongest ones. In order to identify these strongest paths (experienced by the receiver 200 as delayed receipt of the signal), the RAKE combiner and channel estimator 205 includes a path searcher 207. An output of the combiner/estimator 205 is provided to a symbol detector 209 that produces information that is further processed as appropriate for the particular communication system. RAKE combining and channel estimation are well known in the art.

In exemplary embodiments, the path searcher 207 is the unit that carries out the various measurements (e.g., RSCP and Ec/Io) of the measured surroundings described herein. A consequence of this is that every time the path searcher 207 is called on to perform such measurements, it is also performing a path search operation, thereby expending more power.

The various measurements described herein are supplied to a processor 211, which carries out the processes described herein. In the exemplary embodiment, the processor 211 is depicted as a unit separate and apart from other units. However, in alternative embodiments, the processor may be implemented as part of another unit, and programmed or hard-wired to perform the herein-described operations in addition to other functions. In still other alternative embodiments, two or more processors may be utilized to carry out the techniques described herein, with each processor assigned only a subset of the total number of tasks that must be executed.

Figure 3:
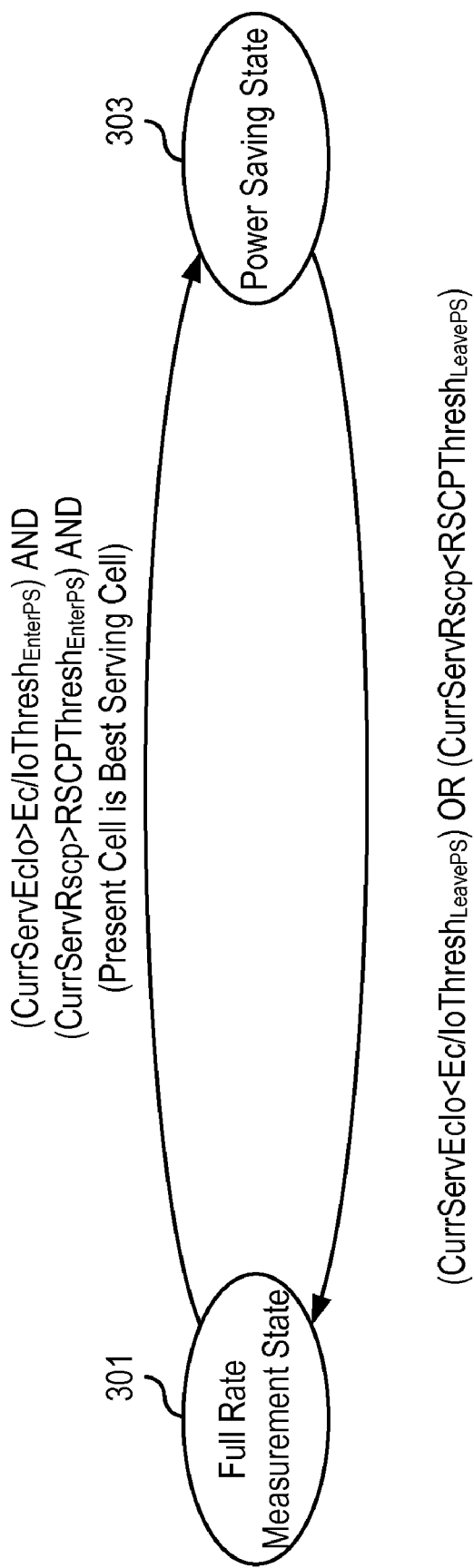
FIG. 3 is a state transition diagram that shows how state changes are made in accordance with an embodiment of the invention.

As mentioned earlier, measurement state changes are triggered based on the results of comparisons of existing measurements with certain threshold values. FIG. 3 is a state transition diagram that shows how state changes are made in accordance with an embodiment of the invention. In this embodiment, the UE operates in one of two states: Full Rate Measurement State 301, and Power Saving State 303. Upon power up, for example, the UE may start out in Full Rate Measurement State 301. As part of its operation, the UE periodically measures the Ec/Io value of its serving cell (e.g., by measuring the CPICH of its serving cell). A current value of the measured Ec/Io is herein denoted "CurrServEcIo". The UE also periodically measures the RSCP of its serving cell. A current value of the measured RSCP is herein denoted "CurrServRscp".

Figure 4:
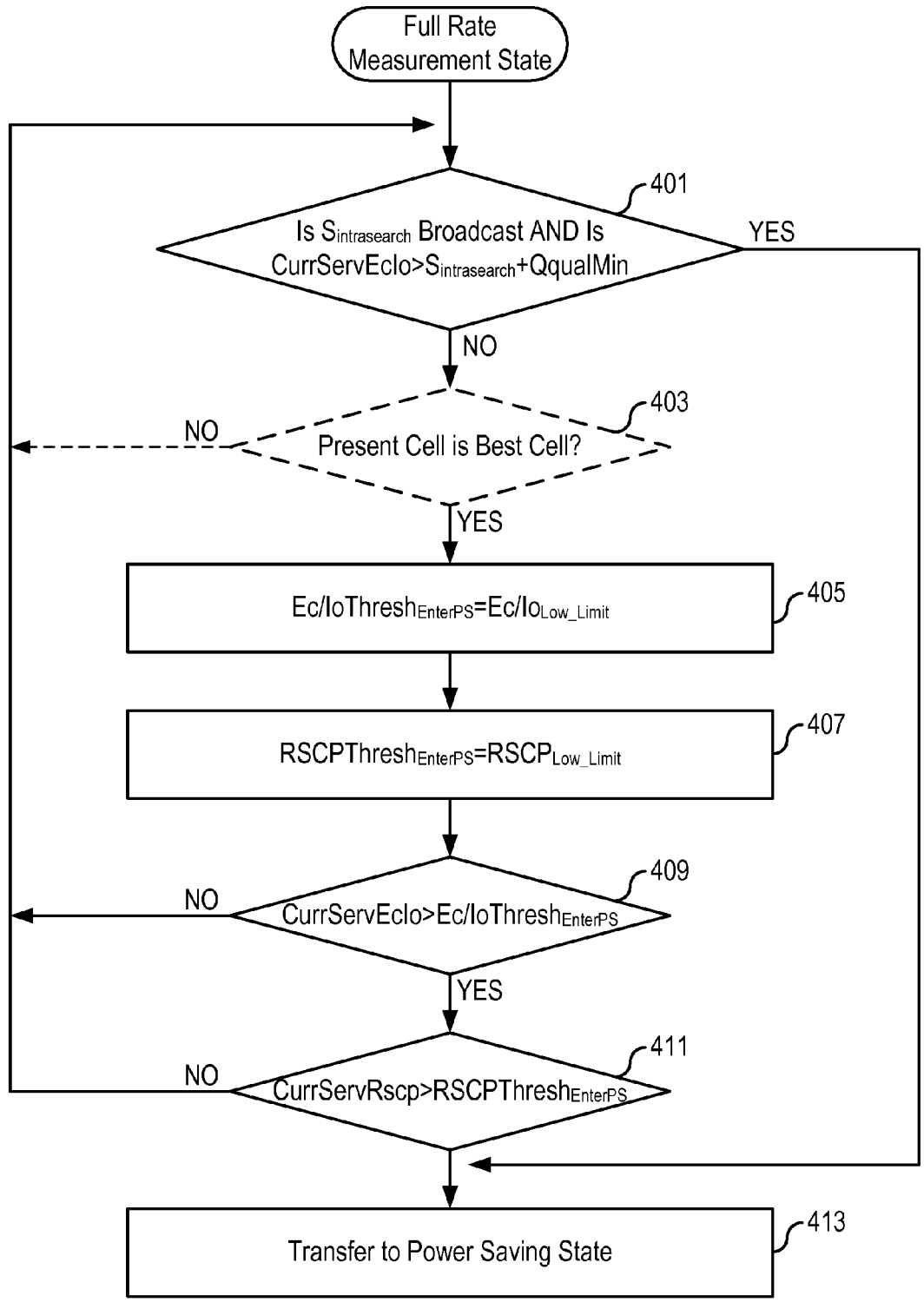
FIG. 4 is a flowchart of exemplary logic for determining whether to transition the UE's operation from Full Rate Measurement State to Power Saving State.

FIG. 4 is a flowchart of exemplary logic for determining whether to change the UE's operation from Full Rate Measurement State to Power Saving State. To make this determination, current measurements are compared to a number of threshold values. In this embodiment, it is first determined whether the network has broadcast a value for the optional measurement-related threshold value $S_{intrasearch}$, and if so, whether the value of CurrServEcIo is greater than the quantity $S_{intrasearch}$+QqualMin (decision block 401) (where QqualMin is a measurement related threshold value that is broadcast by the network to the UEs in a cell).

If the answer is "yes" to both ("YES" path out of decision block 401), then operation of the UE changes from Full Rate Measurement State 301 to Power Saving State 303 (step 413).

If the answer is "no" ("NO" path out of decision block 401), then in some but not all embodiments (as indicated by the dotted lines), changing operation of the UE from Full Measurement State 301 to Power Saving State 303 does not occur unless certain network specified requirements are fulfilled. For example, the network may require that the serving cell be the best available cell (based on current measurement values) before the UE is permitted to go into Power Saving State 303. If there is such a requirement, then a test is made to determine whether that requirement is satisfied (decision block 403). If the requirement is not satisfied (e.g., if the serving cell is not the best cell) ("NO" path out of decision block 403), then the UE remains in Full Rate Measurement State.

Otherwise (or if there are no such network specified requirements, so that the "NO" path out of decision block 401 leads directly to block 405), determining whether to change operation of the UE to Power Saving State 303 continues by determining a first threshold value, Ec/IoThresh$_{EnterPS}$, in accordance with:

$$Ec/IoThresh_{EnterPS}=Ec/Io_{Low\_Limit} \quad \text{(step 405)}$$

where Ec/Io$_{Low\_Limit}$ is a constant stored in the UE. An exemplary value of Ec/Io$_{Low\_Limit}$ is −13 dB. The particular value used in any given application can be based on the radio characteristics of the UE. In alternative embodiments, Ec/Io$_{Low\_Limit}$ can be adapted to the QqualMin of the serving cell. For example, the UE might dynamically set Ec/Io$_{Low\_Limit}$=QqualMin+C dB, where C is a constant that is determined from testing in a laboratory and/or a real environment (e.g., C=3).

Another threshold value, RSCPThresh$_{EnterPS}$, is determined in accordance with:

$$RSCPThresh_{EnterPS}=RSCP_{Low\_Limit} \quad \text{(step 407)}$$

where:

RSCP$_{Low\_Limit}$ is a constant stored in the UE. An exemplary value of RSCP$_{Low\_Limit}$ is −100 dBm. The particular value used in any given application can be based on the radio characteristics of the UE. In alternative embodiments, $RSCP_{Low\_Limit}$ can be adapted, for example, based on a parameter provided by the serving cell, in a similar manner as described above with respect to $Ec/Io_{Low\_Limit}$.

Next, current measurement values are compared with these thresholds, and decisions made accordingly. For example, a test is performed to determine whether CurrServEcIo is greater than $Ec/IoThresh_{EnterPS}$ (decision block 409). If it is ("YES" path out of decision block 409), then it is also tested whether CurrServRscp is greater than $RSCPThresh_{EnterPS}$ (decision block 411). If that relationship is also satisfied ("YES" path out of decision block 411), then it is decided to transition operation of the UE into the Power Saving State 303 (step 413). If either of the tests are not satisfied ("NO" path out of either of decision blocks 409 and 411), then the UE remains in Full Rate Measurement State 301, and testing is repeated with new measurement values.

As mentioned earlier, in alternative embodiments (as indicated by the dotted lines in FIG. 4), changing operation of the UE from Full Measurement State 301 to Power Saving State 303 does not occur unless, in addition to the above two criteria, other requirements are satisfied (according to the specification). For example, it can be required that the present serving cell be the best cell, based on current measurement values (decision block 403). To make this determination, communication networks often broadcast an offset value, herein denoted "ServingCellOffset", that is to be added to the serving cell measured values. The network also provides the UE with another parameter, "MeasQ", which indicates whether Ec/Io measurements are to determine whether the present serving cell is the best serving cell, or whether RSCP measurements are to be used for this purpose. Determination of whether operation of the UE should change from the Full Rate Measurement State 301 to the Power Saving State 303 can then be made in accordance with the logic expressed in the following pseudocode (Note: If $S_{intrasearch}$ has not been provided by the network, then it should be initialized to a very high value, for example a value that is higher than the highest expected value of CurrServEcIo):

```
Ec/IoThresh_EnterPS = Ec/Io_Low_Limit
RSCPThresh_EnterPS = RSCP_Low_Limit
If (CurrServEcIo > (S_intrasearch+QqualMin))  // If true, then network-specified
                                              // conditions permit UE to enter Power
                                              // Saving State
{
GOTO POWER SAVING STATE
}
Else
If (CurrServEcIo>Ec/IoThresh_EnterPS) AND (CurrServRscp>RSCPThresh_EnterPS)
{
      If (MeasQ=RSCP)      // If true, then the network indicated that the
                           // measured quantity RSCP should be considered
      {
            DeltaEcIo = XdB
            DeltaRSCP = CurrServRscp + ServingCellOffset − BestNeighMeasVal
            if (DeltaRSCP>0)   // If current serving cell is the best cell even when
                               // considering offsets provided by the network
            {
                  DeltaRSCP = min(DeltaRSCP, ZdB)
                  GOTO POWER SAVING STATE
            }
      }
      else   // MeasQ=EcIo, meaning that the network indicated that the measured
             // quantity EcIo should be considered
      {
            DeltaRSCP=ZdB
            DeltaEcIo = CurrServEcIo + ServingCellOffset − BestNeighMeasVal
            if (DeltaEcIo>0)    // If current serving cell is the best cell even when
                                // considering offsets provided by the network
            {
                  DeltaEcIo = min(DeltaEcIo, XdB)
                  GOTO POWER SAVING STATE
            }
      }
}
``` where:

X and Z are constants; and

BestNeighMeasVal is the measured value (after applying the corresponding offset values) of the best neighboring cell (as determined after the offsets were applied). For example, assume that a UE situated in a current cell is able to measure the signals from two other cells in the vicinity; call them "NeighCell1" and "NeighCell2". Assume that the following measured values are obtained:

NeighCell1: RSCP=−100 dBm and EcIo=−13 dB

NeighCell2: RSCP=−105 dBm and EcIo=−17 dB

Assume further that the network has broadcast the following information in the neighboring cell information list:

"MeasQ is RSCP", and the following offsets shall be applied:

NeighCell1: +3

NeighCell2: −5

According to 3GPP specifications, these offsets should be deducted before considering the measured values in any equation. This yields:

Measurement quantity is RSCP and offsets shall be applied to the RSCP values, so NeighCell1: RSCP=−100 dBm−(+3)=−103 dBm and EcIo=− 13 dB NeighCell2: RSCP=−105 dBm−(−5)=−100 dBm and EcIo=− 17 dB Because determination of which is the best neighboring cell is based on RSCP values, the above numbers indicate that, in this example, NeighCell2 is the best neighboring cell.

Figure 5:
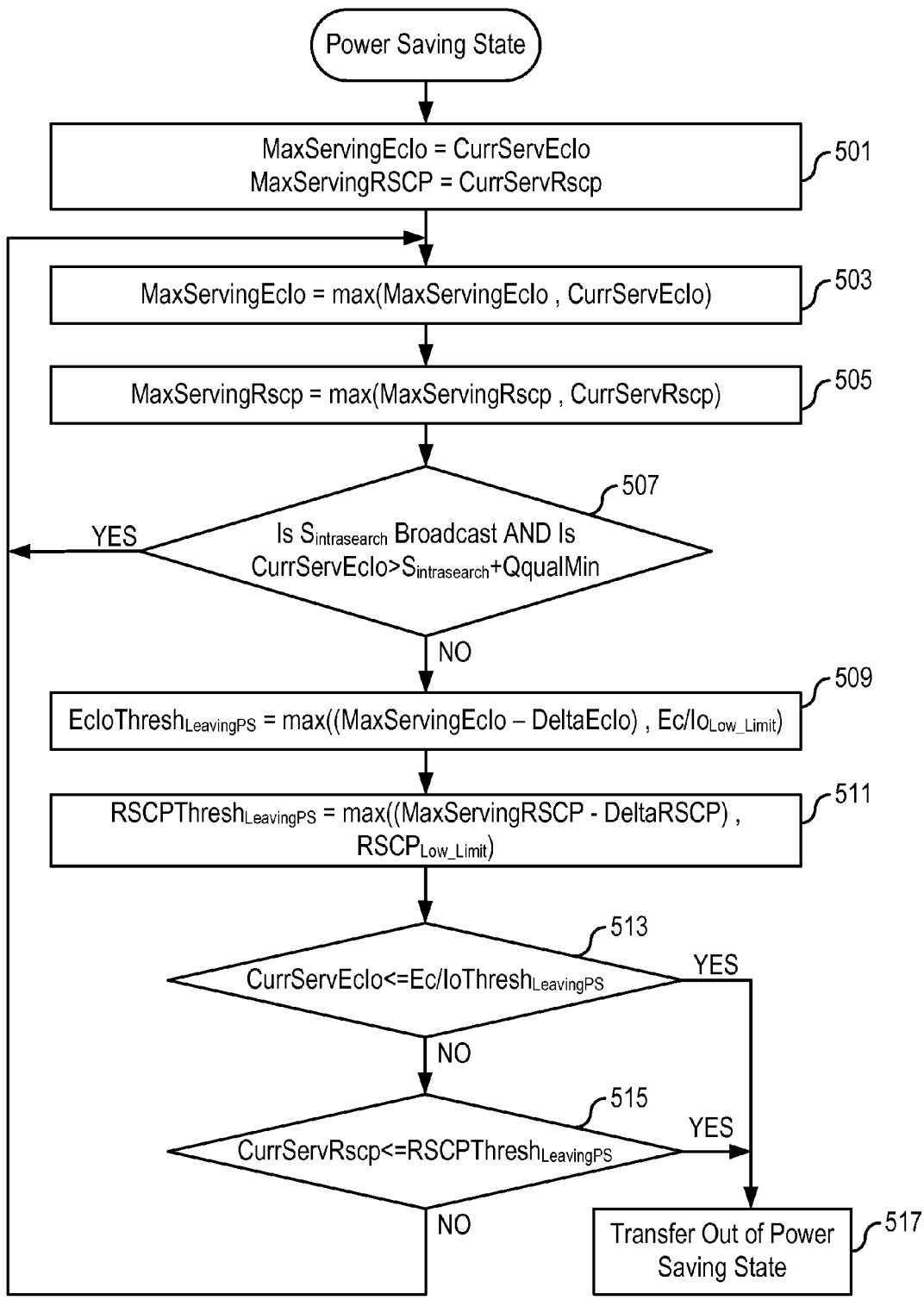
FIG. 5 depicts exemplary logic for determining whether to leave the Power Saving State.

The discussion will now focus on logic that, in an environmentally adaptable way, determines whether to leave the Power Saving State 303. By being able to adapt to the environment (e.g., by detecting stable radio environments), the UE can be operated in the Power Saving State 303 for longer periods of time, thereby conserving even more energy. An exemplary embodiment of such logic is depicted in the flowchart of FIG. 5. In one aspect, the logic dynamically maintains parameters representing, respectively, the highest Ec/Io and highest RSCP values measured during the time the UE is in the Power Saving State 303. One embodiment for doing this includes, upon first entering the Power Saving State 303, setting a first variable, MaxServingEcIo (representing the highest Ec/Io value measured during the time the UE is in the Power Saving State 303) equal to the presently measured Ec/Io value (represented by the variable "CurrServEcIo") and setting a second variable, MaxServingRSCP, (representing the highest RSCP value measured during the time the UE is in the Power Saving State 303) equal to the presently measured RSCP value (represented by the variable "CurrServRscp") (step 501).

After this initialization, the process proceeds by comparing the last value of MaxServingEcIo to an updated version of CurrServEcIo, and setting MaxServingEcIo equal to the larger of the two (step 503). In this way, MaxServingEcIo will always represent the highest value of EcIo measured so far (i.e., while in Power Saving State 303). In this case, the highest value represents the best one of the EcIo measurements made during Power Saving State 303. In alternative embodiments, one could design the logic differently, for example, in which a lowest parameter value represented the best one of the EcIo measurements made during Power Saving State 303.

Similarly, the last value of MaxServingRSCP is compared to an updated version of CurrServRscp, and MaxServingRSCP is set equal to the larger of the two (step 505). In this way, MaxServingRSCP will always represent the highest value of RSCP measured so far (i.e., while in Power Saving State 303). In this case, the highest value represents the best one of the RSCP measurements made during Power Saving State 303. In alternative embodiments, one could design the logic differently, for example, in which a lowest parameter value represented the best one of the RSCP measurements made during Power Saving State 303.

In another aspect, it is determined whether network-specified conditions permit the UE to remain in Power Saving State 303. In this example, this is illustrated by testing whether the parameter $S_{intrasearch}$ has been broadcast by the network, and if so whether the value of CurrServEcIo is greater than the quantity $S_{intrasearch}$+QqualMin (decision block 507). If these conditions are true ("YES" path out of decision block 507), the UE remains in Power Saving State 303.

If not ("NO" path out of decision block 507), further testing is performed to determine whether other conditions exist that indicate that the UE's environment is sufficiently stable to permit it to remain in Power Saving State 303. In particular, a dynamically determined threshold value, $EcIoThresh_{LeavingPS}$, is determined in accordance with:

$EcIoThresh_{LeavingPS}=\max((\text{MaxServing}EcIo-\text{Delta}EcIo), EcIo_{Low\_Limit})$ (step 509)

wherein DeltaEcIo maintains the last value it was set to during Full Measurement State 301 (see exemplary pseudocode above).

Another dynamically determined threshold, $RSCPThresh_{LeavingPS}$, is determined in accordance with:

$RSCPThresh_{LeavingPS}=\max((\text{MaxServing}RSCP-\text{Delta}RSCP), RSCP_{Low\_Limit})$ (step 511), wherein DeltaRSCP maintains the last value it was set to during Full Measurement State 301 (see exemplary pseudocode above).

Currently measured values of Ec/Io and RSCP are then compared against the respective threshold values $EcIoThresh_{LeavingPS}$ and $RSCPThresh_{LeavingPS}$ (decision blocks 513 and 515), and decisions are made based on these comparisons. In particular operation of the UE changes out of Power Saving State 303 if CurrServEcIo is less than or equal to $EcIoThresh_{LeavingPS}$ ("YES" path out of decision block 513) or if CurrServRscp is less than or equal to $RSCPThresh_{LeavingPS}$ ("YES" path out of decision block 515).

Figure 6:
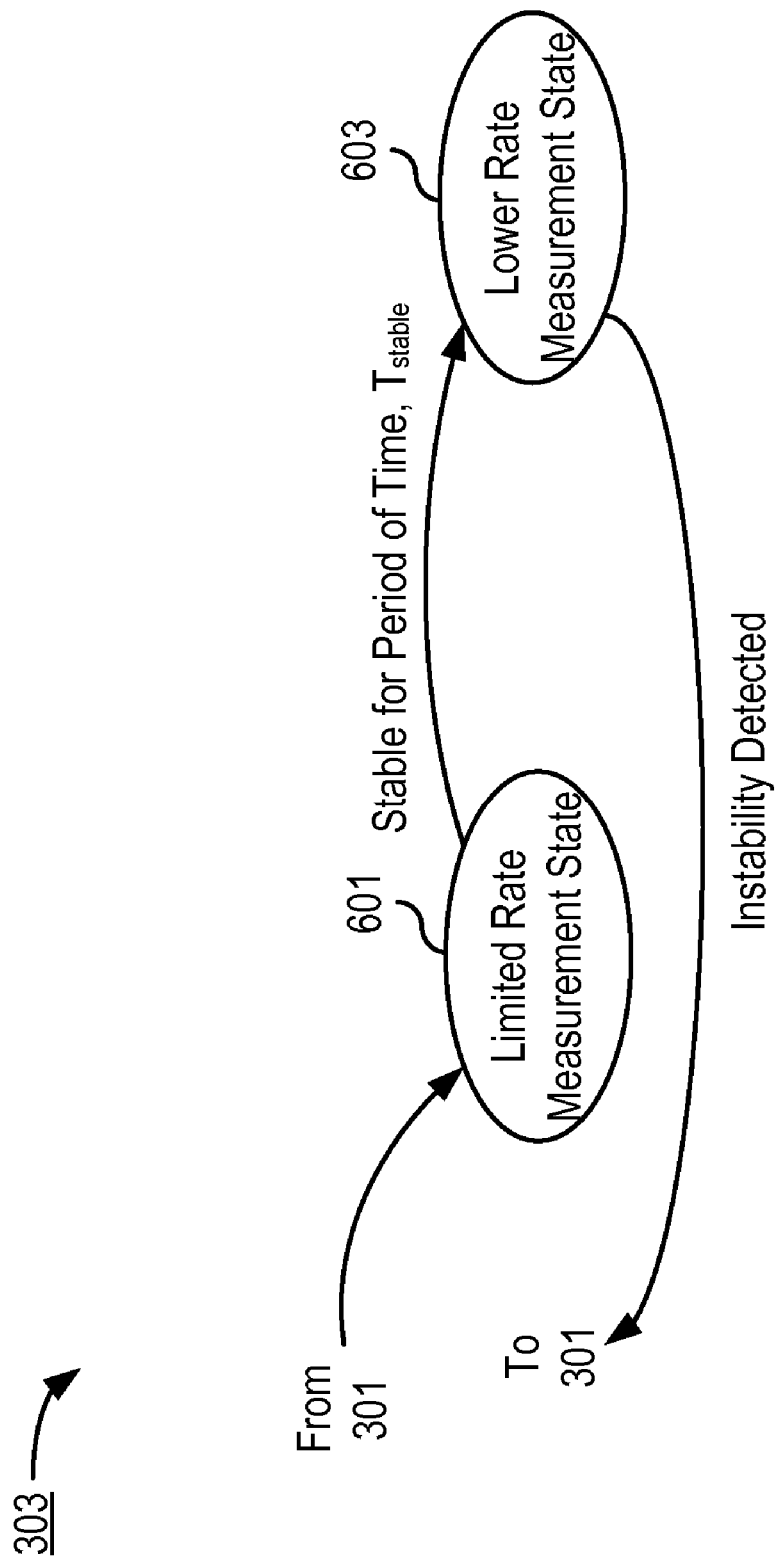
FIG. 6 is a state transition diagram that shows how the Power Saving State can, itself, comprise several states, and further shows how state changes are made between these states.

As mentioned earlier, the Power Saving State 303 may represent a single state, for example, either Limited Rate Measurement State or Lower Rate Measurement State. However, in alternative embodiments, the Power Saving State 303 can comprise a number of states, for example Limited Rate Measurement State 601 and Lower Rate Measurement State 603 as depicted in the state transition diagram of FIG. 6.

As an example, entry into the Power Saving State 303 from the Full Rate Measurement State 301 can be made into the Limited Rate Measurement State 601. If measurements of CurrServEcIo and/or CurrServRscp are sufficiently stable over a predefined time period, $T_{stable}$, or alternatively for a predefined number of measurements, then operation of the UE transitions into the Lower Rate Measurement Stage 603.

If an instability of CurrServEcIo and/or CurrServRscp is detected, then operation of the UE transitions out of the Lower Rate Measurement State 603 into, for example, the Full Rate Measurement State 301. In alternative embodiments, if only slight instability is detected, operation could transition from Lower Rate Measurement State 603 back to Limited Rate Measurement State 601, with transitioning back to Full Rate Measurement State 301 occurring only if a substantial enough instability is detected.

In another aspect, a hysteresis can be added to state transitions in order to avoid having a system that, instead of settling into a state for any substantial period of time, "ping-pongs" back and forth between states. For example, the various embodiments described above can be modified such that once an unstable environment is detected, the UE operation transitions to the Full Measurement State 301 and then remains there for some predefined period of time regardless of any subsequent detection of a stable environment.

In another aspect, it is beneficial to implement threshold comparison modules in or close to the receiver module within the UE.

Various embodiments offer an environmentally adaptable way of decreasing power consumption of a UE. An advantage of the techniques described here is that, even in poor radio environments (e.g., with weak radio signals), unnecessary measurements are avoided in stable environments. By contrast, conventional techniques, which employ only static thresholds for determining when to change measurement states, often result in unnecessary measurements being made, even if the UE is, for example, placed on a table.

Another advantage is that, even in telecommunication environments in which the network is not signaling the $S_{intrasearch}$ parameter (or its equivalent in non-WCDMA systems), a UE practicing the invention is still able to make decisions about going into the Power Saving State 303.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating user equipment (UE) in a cellular telecommunications system, the method comprising:

causing the UE to begin operating in a power saving state by determining that a first set of predefined criteria have been satisfied; and causing the UE to leave the power saving state by determining that a second set of predefined criteria have been satisfied, wherein determining that the second set of predefined criteria have been satisfied includes:

making a plurality of signal quality measurements of a signal received from a serving cell during power saving state;

determining which of the plurality of signal quality measurements represents a best one of the signal quality measurements;

determining a threshold value as a function of the best one of the signal quality measurements; and determining that the second set of predefined criteria have been satisfied if a current signal quality measurement satisfies a predefined relationship with respect to the threshold value.

2. The method of claim 1, wherein determining the threshold value as a function of the best one of the signal quality measurements comprises:

subtracting a signal quality measurement of a neighboring cell's signal from the best one of the signal quality measurements.

3. The method of claim 1, comprising:

receiving a serving cell offset value from a serving cell of the UE; and wherein determining the threshold value as a function of the best one of the signal quality measurements comprises:

adjusting the best one of the signal quality measurements by subtracting a signal quality measurement of a neighboring cell's signal from the best one of the signal quality measurements and by adding the serving cell offset value.

4. The method of claim 3, wherein determining the threshold value as a function of the best one of the signal quality measurements comprises:

selecting the adjusted best one of the signal quality measurements if the adjusted best one of the signal quality measurement does not indicate a lower quality than a predetermined low limit value.

5. The method of claim 1, comprising:

determining that the second set of predefined criteria have been satisfied if the current signal quality measurement satisfies a predetermined relationship with respect to a term derived from one or more telecommunication network-supplied parameters.

6. The method of claim 5, wherein the telecommunications system is a Wideband Code Division Multiple Access (WCDMA) telecommunications system, and the term derived from the one or more telecommunication network-supplied parameters is $S_{intrasearch}+QqualMin$, wherein $S_{intrasearch}$ is a parameter that specifies a threshold for intra-frequency measurements, and QqualMin defines a minimum required quality level within the serving cell.

7. The method of claim 1, wherein the plurality of signal quality measurements are a plurality of signal-to-noise ratio measurements.

8. The method of claim 1, wherein the plurality of signal quality measurements are a plurality of received signal code power measurements.

9. The method of claim 1, comprising:

upon entering a full measurement state from the power saving state, remaining in the full measurement state for a predefined period of time regardless of a determination that the first set of predefined criteria have been satisfied during the predefined period of time.

10. The method of claim 1, wherein:

the power saving state comprises a first power saving state and a second power saving state, wherein fewer measurements are made during the second power saving state than in the first power saving state; and the method comprises:

entering the first power saving state from a full measurement state; and detecting that the first set of predefined criteria have been satisfied for a predefined period of time, and in response to said detection, causing the UE to begin operating in the second power saving state.

11. The method of claim 1, wherein determining that the first set of predefined criteria have been satisfied includes:

making a current signal quality measurement of a signal received from the serving cell during a non-power saving state;

determining a threshold value as a function of a constant stored in the UE; and determining that the first set of predefined criteria have been satisfied if the current signal quality measurement satisfies a predefined relationship with respect to the threshold value.

12. The method of claim 11, wherein determining the threshold value as a function of the constant stored in the UE comprises combining the constant stored in the UE with a value supplied by the telecommunications network.

13. An apparatus for operating user equipment (UE) in a cellular telecommunications system, the apparatus comprising:

logic configured to cause the UE to begin operating in a power saving state by determining that a first set of predefined criteria have been satisfied; and logic configured to cause the UE to leave the power saving state by determining that a second set of predefined criteria have been satisfied, wherein determining that the second set of predefined criteria have been satisfied includes:

making a plurality of signal quality measurements of a signal received from a serving cell during power saving state;

determining which of the plurality of signal quality measurements represents a best one of the signal quality measurements;

determining a threshold value as a function of the best one of the signal quality measurements; and determining that the second set of predefined criteria have been satisfied if a current signal quality measurement satisfies a predefined relationship with respect to the threshold value.

14. The apparatus of claim 13, wherein determining the threshold value as a function of the best one of the signal quality measurements comprises:

subtracting a signal quality measurement of a neighboring cell's signal from the best one of the signal quality measurements.

15. The apparatus of claim 13, comprising:

receiving a serving cell offset value from a serving cell of the UE; and wherein determining the threshold value as a function of the best one of the signal quality measurements comprises:

adjusting the best one of the signal quality measurements by subtracting a signal quality measurement of a neighboring cell's signal from the best one of the signal quality measurements and by adding the serving cell offset value.

16. The apparatus of claim 15, wherein determining the threshold value as a function of the best one of the signal quality measurements comprises:

selecting the adjusted best one of the signal quality measurements if the adjusted best one of the signal quality measurement does not indicate a lower quality than a predetermined low limit value.

17. The apparatus of claim 13, wherein determining that the second set of predefined criteria have been satisfied includes:

determining that the second set of predefined criteria have been satisfied if the current signal quality measurement satisfies a predetermined relationship with respect to a term derived from one or more telecommunication network-supplied parameters.

18. The apparatus of claim 17, wherein the telecommunications system is a Wideband Code Division Multiple Access (WCDMA) telecommunications system, and the term derived from the one or more telecommunication network-supplied parameters is $S_{intrasearch}$+QqualMin, wherein $S_{intrasearch}$ is a parameter that specifies a threshold for intra-frequency measurements, and QqualMin defines a minimum required quality level within the serving cell.

19. The apparatus of claim 13, wherein the plurality of signal quality measurements are a plurality of signal-to-noise ratio measurements.

20. The apparatus of claim 13, wherein the plurality of signal quality measurements are a plurality of received signal code power measurements.

21. The apparatus of claim 13, comprising:

logic that, upon entering a full measurement state from the power saving state, causes the UE to remain in the full measurement state for a predefined period of time regardless of a determination that the first set of predefined criteria have been satisfied during the predefined period of time.

22. The apparatus of claim 13, wherein:

the power saving state comprises a first power saving state and a second power saving state, wherein fewer measurements are made during the second power saving state than in the first power saving state; and the apparatus comprises:

logic that, after entering the first power saving state from a full measurement state, detects that the first set of predefined criteria have been satisfied for a predefined period of time, and in response to said detection, causes the UE to begin operating in the second power saving state.

23. The apparatus of claim 13, wherein determining that the first set of predefined criteria have been satisfied includes:

making a current signal quality measurement of a signal received from the serving cell during a non-power saving state;

determining a threshold value as a function of a constant stored in the UE; and determining that the first set of predefined criteria have been satisfied if the current signal quality measurement satisfies a predefined relationship with respect to the threshold value.

24. The apparatus of claim 23, wherein determining the threshold value as a function of the constant stored in the UE comprises combining the constant stored in the UE with a value supplied by the telecommunications network.

* * * * *